United States Patent [19]
Olson

[11] Patent Number: 5,399,806
[45] Date of Patent: Mar. 21, 1995

[54] MODULAR ELECTRICAL WIRING SYSTEM

[76] Inventor: Richard A. Olson, 6321 191st La. North, Anoka, Minn.

[21] Appl. No.: 839,792

[22] Filed: Feb. 21, 1992

[51] Int. Cl.⁶ .............................................. H02G 3/12
[52] U.S. Cl. ...................................... 174/53; 174/57; 174/63; 248/DIG. 6
[58] Field of Search .......................... 174/48, 53–58, 174/61–64; 202/3.9, 3.92; 248/DIG. 6

[56] References Cited

U.S. PATENT DOCUMENTS

| | | | |
|---|---|---|---|
| 2,316,389 | 4/1943 | Atkinson | 174/63 X |
| 3,922,478 | 11/1975 | Perkey | 174/53 |
| 3,977,640 | 8/1976 | Arnold et al. | 174/58 X |
| 4,165,443 | 8/1979 | Figart et al. | 174/53 |
| 4,336,418 | 6/1982 | Hoag | 174/53 |
| 4,399,922 | 8/1983 | Horsley | 220/3.9 X |
| 4,483,453 | 11/1984 | Smolik | 174/58 X |
| 4,918,258 | 4/1990 | Ayer | 174/53 |
| 4,924,032 | 5/1990 | Akins | 174/53 |
| 4,958,048 | 9/1990 | Bell | 174/57 X |

FOREIGN PATENT DOCUMENTS

| | | | |
|---|---|---|---|
| 821811 | 11/1951 | Germany | 174/63 |

*Primary Examiner*—Peter Dungba Vo
*Attorney, Agent, or Firm*—Peterson, Wicks, Nemer & Kamrath

[57] ABSTRACT

A modular electrical wiring system (10) is shown including a hanger (12) and an electrical connection block (26) independently and adjustably held from the hanger (12) by four adjustment screws (106). The electrical connection block (26) is formed from three control boxes (28, 30, 32) and a receptacle box (34) which sandwiches bus bars (50) therebetween. Each bus bar (50) includes a connecting portion (56) located in one of three depressions (38–40) and which are accessible at different depths through slots (88, 90, 104) formed in the second, third, and receptacle boxes (30, 32, 34). The connecting straps (122) of electrical devices such as an outlet (110) or a switch (190) are sandwiched between a cover plate (182) and the receptacle box (34). The switch (190) includes bus bars (196, 198) having first ears (204, 220) sandwiched between the casings (192, 194) and second ears (206, 222) having the electrical contacts (212, 228), with the ears (204, 206, 220, 222) being bent from legs (202, 218) extending through slots (213, 230) in the casing (192). The outlet (110) includes a T-shaped ground conductor (118) having end portions (154) extending from the head (152) for slideable receipt on the outer faces of pedestals (158) located inside of a cavity (156) formed in the casing (112) and having a leg (150) also extending from the head (152) through a slot (162) formed in the casing (112).

29 Claims, 4 Drawing Sheets

MODULAR ELECTRICAL WIRING SYSTEM

BACKGROUND

The present invention generally relates to electrical wiring systems for buildings of all types including but not limited to residential, commercial, industrial, etc., particularly to modular electrical wiring systems, and specifically to modular electrical wiring systems allowing substantial prewiring before the installation of the wall on the framing members and allowing ease of installation of the electrical devices after installation of the wall.

In the typical installation of electrical service in buildings, hand-wiring of the electrical devices by a skilled electrician is often performed after the installation of the wall on the framing members. This is typically performed through a small access hole through the wall of a size corresponding to the junction box, and especially for outlets requires the electrician to kneel during installation. Thus, a need has been long recognized to allow as much prewiring as possible before the installation of the walls and to remove as much hand-wiring as possible especially after the installation of the walls. Although several prior systems have been previously devised, such prior systems have not gained wide acceptance in the field. It is believed that some of the reasons that acceptance has not been forthcoming include the costs of such systems in comparison to conventional systems, with the costs being increased because of the large number of different components requiring extensive assembly, the ease at which misconnection of wiring can occur (including the comfort of electricians to continue with existing systems while not having to learn new standards for different systems), the unconventional appearance and shapes of the new systems, and like factors.

SUMMARY

The present invention solves this need and other problems in electrical wiring systems and overcomes the shortcomings of prior electrical wiring systems by providing, in the preferred form, a housing comprising first, second and third control boxes and a receptacle box secured in a stacked condition, with bus bars located in the first, second, and third boxes and accessible at different depths through slots formed in the second, third, and receptacle boxes.

In another aspect of the present invention, the housing is independently and adjustably held from the web of a hanger secured to the framing member by at least three locations allowing the front face of the housing to be adjusted relative to the web to be planar with the outer surface of the wall.

In a preferred form, a switch is provided including conductors having contact blades extending through slots in the lower casing, having integral first ears including upper and lower ends abutting with the upper and lower casings, and having second ears including first portions integral with the contact blades and second portions movable into and out of electrical contact.

Also, in a preferred form, an outlet is provided comprising a T-shaped ground conductor including a head having bent end portions abutting with the outer faces of first and second pedestals of the lower casing and captured between the upper ends of the pedestals and the upper casing, with a leg bent generally perpendicular to the head and extending through a slot in the lower casing. In yet another aspect, the neutral and hot conductors each includes a rectangular portion which abuts with the upper and lower casings and includes a leg integrally extending from the lower edge thereof through a slot in the lower casing and means integrally extending from the side edge thereof for the slideable receipt of the prong of an electrical plug-in.

It is thus an object of the present invention to provide a novel modular electrical wiring system.

It is further an object of the present invention to provide such a novel modular electrical wiring system allowing adjustment of the front face of the housing relative to the outer surface of the wall.

It is further an object of the present invention to provide such a novel modular electrical wiring system including a housing of stacked boxes which can be color-coded according to electrical standards.

It is further an object of the present invention to provide such a novel modular electrical wiring system including a housing comprised of multiple components of generally the same construction.

It is further an object of the present invention to provide such a novel modular electrical wiring system including a housing having bus bars with limited electrical accessibility to prevent the possibility of shock or short circuiting.

It is further an object of the present invention to provide such a novel modular electrical wiring system including one-piece bus bars for the housing, the switch and the outlet formed of stamped sheet material.

It is further an object of the present invention to provide such a novel modular electrical wiring system including switches and outlets formed of few components which can be easily assembled.

It is further an object of the present invention to provide such a novel modular electrical wiring system including a housing which can be prewired prior to the installation of the wall.

It is further an object of the present invention to provide such a novel modular electrical wiring system including switches and outlets which do not require hand-wiring to the junction box.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "end", "inner", "upper", "lower", "side", "outer", "back", "front", and similar terms are used herein, it should be understood that these terms have reference only to the structure shown in the drawings as it would appear to a person viewing the drawings and are utilized only to facilitate describing the invention.

DESCRIPTION

Figures 1, 10:
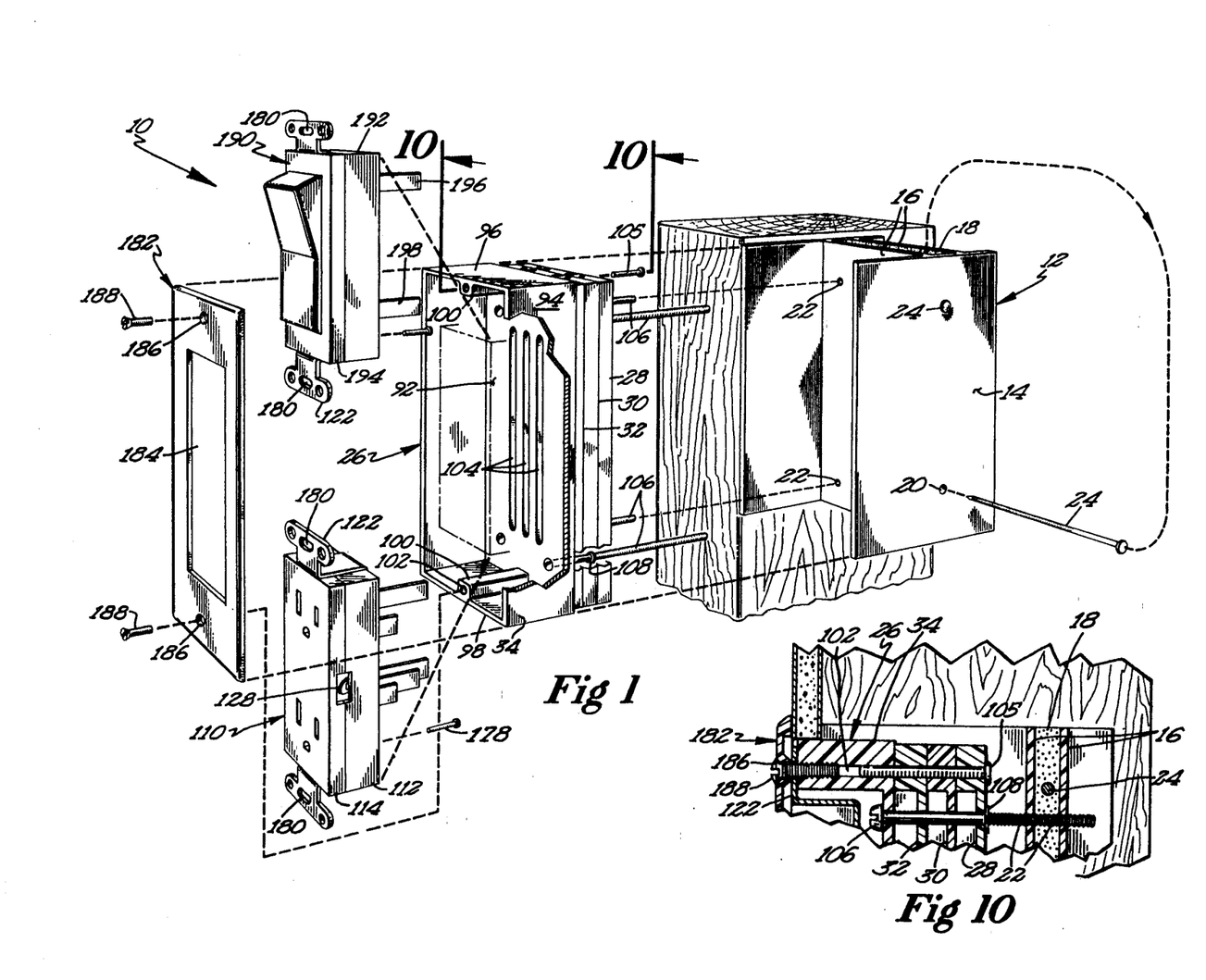
FIG. 1 shows an exploded perspective view of a modular electrical wiring system according to the preferred teachings of the present invention.
FIG. 10 shows a cross sectional view of the modular electrical wiring system of FIG. 1 according to section line 10—10 of FIG. 1.

A modular electrical wiring system according to the preferred teachings of the present invention is shown in the drawings and generally designated 10. Generally, system 10 according to the preferred teachings of the present invention includes an adjustable nailer, hanger, or base 12 which in the preferred form is generally in the shape of an I-beam. Specifically, base 12 includes first and second plates 14 held in a spaced parallel arrangement by first and second, parallel, spaced connecting webs 16. A block 18 of foam-type material is pressfit between webs 16 and plates 14. First and second holes 20 for slideable receipt of nails extend through plates 14 and block 18 intermediate and parallel to webs 16. Four adjustment holes 22 extend through webs 16 and block 18 intermediate and parallel to plates 14. The height of base 12 is greater than its width between plates 14. Webs 16 are generally closely spaced, with webs 16 being spaced a multiple of times their spacing from the front edges of plates 14 and being spaced in the order of their spacing from the back edges of plates 14. In the most preferred form, plates 14 and webs 16 are integrally formed together such as by extrusion. System 10 further includes first and second nails 24 which pass through holes 20 and into a stud or other framing member for securing base 12 to the stud or framing member with webs 16 generally parallel to the outer wall surface. In the most preferred form, the front edges of plates 14 can be aligned as a guide with the face of the stud which is abutted by the wall for ease of installation. Nails 24 having a length longer than the width of base 12 but shorter than the height of base 12 can be inserted for shipment and storage in block 18 between webs 16 and generally parallel to plates 14 for ease of packaging, storage, and transportation. It should also be noted that holes 20 through block 18 allow for ease of insertion and alignment of nails 24 through holes 20 of plates 14.

Figure 3:
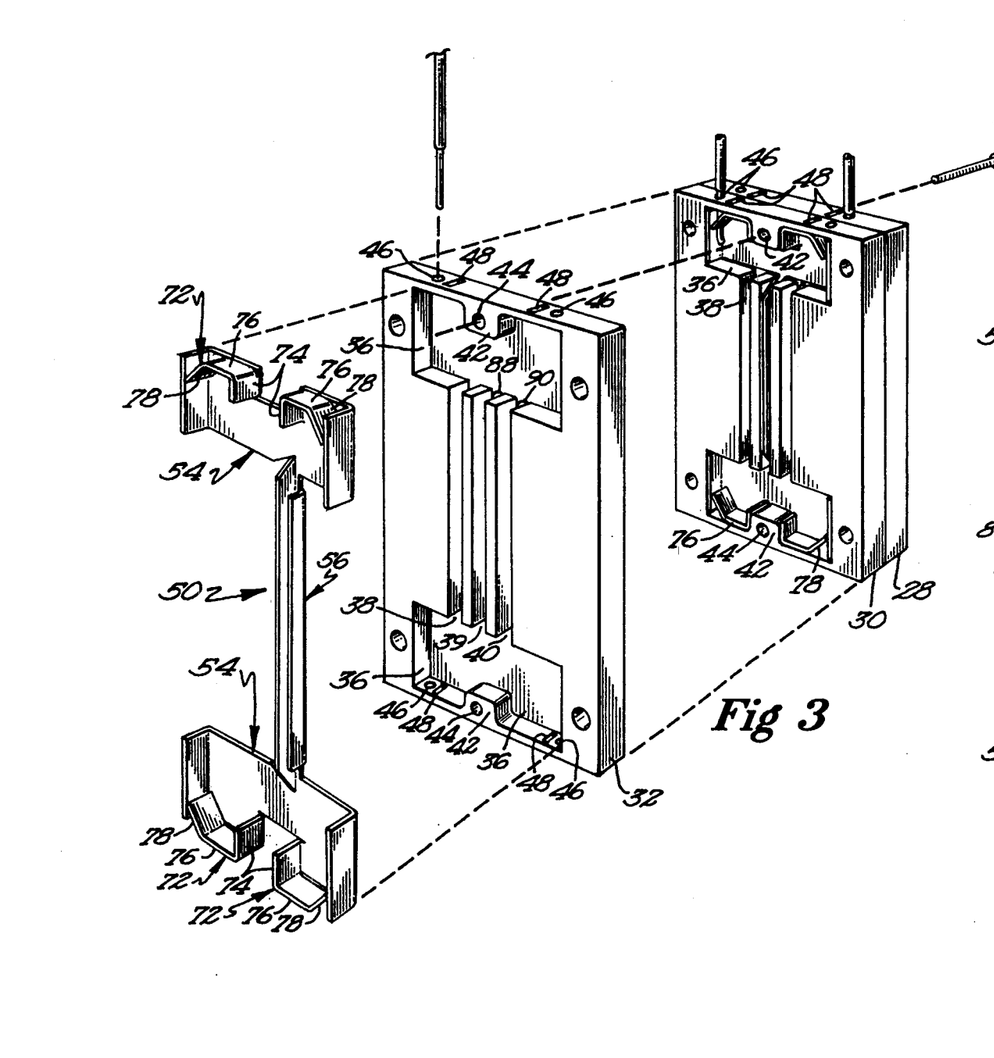
FIG. 3 shows an exploded perspective view of portions of an electrical connection block according to the preferred teachings of the present invention usable in the modular electrical wiring system of FIG. 1.

System 10 according to the preferred teachings of the present invention further includes a modular electrical connection block 26. In the most preferred form, block 26 includes a neutral control box 28, a ground control box 30, a hot control box 32, and a housing or receptacle box 34 for receipt of an electrical device. Boxes 28, 30, and 32 are generally of the same construction and preferably are formed by utilizing the same injection molds. However, box 28 is preferably white in color, box 30 is preferably green in color, and box 32 is preferably black in color corresponding to standard electrical color coding. Generally, boxes 28, 30, and 32 are in the form of plates having first and second, enlarged, generally rectangular cavities 36 extending from the front face and spaced from the back face and the top, bottom, and side edges, with cavities 36 intersecting and interconnected by first, second, and third channel depressions 38, 39, and 40 spaced and parallel to each other and extending from the front face towards but spaced from the back face and generally parallel to and spaced from the side edges. An alignment projection 42 extends into each cavity 36 from the respective top or bottom edge of box 28, 30, and 32 generally intermediate the side edges, with alignment projection 42 including a securement aperture 44 extending therethrough. Boxes 28, 30, and 32 include four openings 46 of a size for slideable receipt of a stripped electrical wire of a power distribution cable and generally parallel to the side edges of boxes 28, 30, and 32 and adjacent to and parallel the outside surfaces of cavities 36. Boxes 28, 30, and 32 further include slots 48 for slideable receipt of a screwdriver or the like and generally parallel to the side edges of boxes 28, 30, and 32 and parallel to and spaced inwardly of openings 46.

Figure 7:
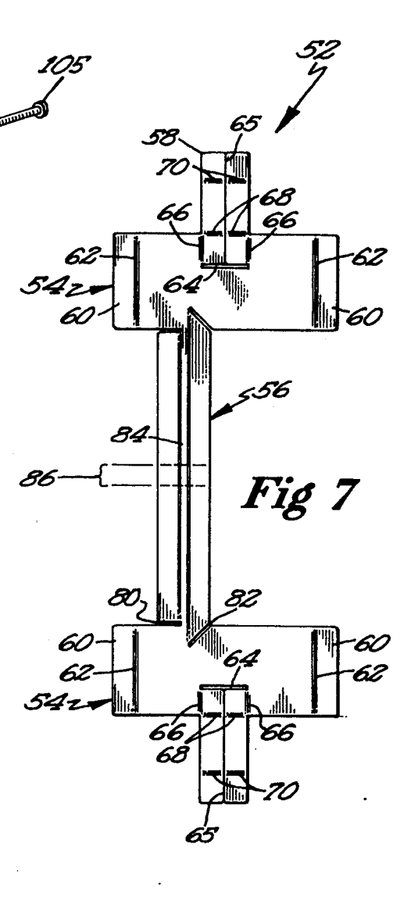
FIG. 7 shows a flat layout of a bus bar of the electrical connection block of FIG. 3.

Boxes 28, 30, and 32 each slideably receive a bus bar 50 which is generally of the same construction and preferably is formed from a flat sheet 52 of electrically conductive material such as brass shown in FIG. 7. Particularly, sheet 52 includes first and second head portions 54 which will be cut and bent to slideably fit within cavities 36 and which are interconnected by a connecting portion 56 which will be cut and bent to slideably fit within one of the depressions 38, 39 or 40 depending upon which box 28, 30, and 32 bus bar 50 will be utilized in. Head portions 54 each include a longitudinally extending rectangular portion 58 extending from an enlarged laterally extending rectangular portion 60. Portion 60 is bent adjacent its side edges at 62 to form side plates for abutting with the side edges of cavity 36, with the outer and inner edges of portion 60 abutting with the outer and inner edges of cavity 36. Portion 60 further includes a cut 64 spaced from the outer edge of portion 60 generally equal to the spacing of the inner edge of projection 42 into cavity 36 and of a width generally equal to that of the width of projection 42 and of portion 58. Portion 58 includes a longitudinal cut 65 located intermediate the side edges thereof to divide portion 58 into halves. Each half of portion 58 is then bent along bend 66 in portion 60 extending from the outer edge of portion 60 to cut 64 and generally in line with the outer side edge of portion 58 and generally perpendicular to portion 60. Each half of portion 58 is further bent generally perpendicularly along bend 68 generally in line with the outer edge of portion 60. Each half of portion 58 is further bent at an obtuse angle along bend 70 generally parallel to bend 68 and spaced therefrom a distance less than the spacing of projection 42 from the side edges of cavity 36. Thus, first and second arms 72 are formed each including a first portion 74 extending between cut 64 and bend 68 which abuts with the side edges of projection 42, a second portion 76 extending between bends 68 and 70 which abuts with the outer edge of cavity 36, and a third portion 78 extending between bend 70 and the free end of portion 58, which extends at an obtuse angle from the outer edge of cavity 36 and the free end of which abuts with the side plates of portion 60 formed by bends 62 and at a point inwardly of the outer edge of portion 60.

Connecting portion 56 includes first cuts 80 extending from one of the side edges thereof less than one-half of the width thereof and generally aligned with the inner edges of portions 60. Connecting portion 56 further includes second cuts 82 extending from the other side edge thereof less than one-half of the width thereof and at an obtuse angle with the inner edges of portions 60. Connecting portion 56 is bent into a generally V-shape along a bend 84 extending longitudinally between portions 54 and particularly cuts 80 and 82 thereof. A portion 86 can be removed from connecting portion 56 intermediate portions 54 when it is desired to electrically isolate first and second head portions 54 from each other.

In the preferred form of the present invention shown, connecting portion 56 is located generally intermediate bends 62 of portions 54 when bus bar 50 is desired to be located in depression 39 of box 28. It can then be appreciated that connecting portion 56 is located to one side or the other of the center when bus bar 50 is desired to be located in depression 38 of box 32 or depression 40 of box 28, with bus bars 50 for boxes 28 and 32 being of identical construction but inverted in assembly to place connecting portion 56 in the desired depression 38 or 40. Slots 88 and 90 extend through box 32 corresponding to depressions 39 and 40 and slot 90 extends through box 30 corresponding to depression 40 to allow electrical access to bus bar 50 of boxes 28 and 30.

Receptacle box 34 is in the form of a rectangular parallelepiped including a back 92, sides 94, a top 96, a bottom 98 and an open front. First and second projections 100 are integrally formed with top 96 and bottom 98 of a size, shape, and location corresponding to projections 42 and include securement apertures 102 therethrough. Slots 104 are formed in back 92 corresponding to depressions 38-40 of boxes 28, 30, and 32 to allow electrical access to bus bars 50 of boxes 28, 30, and 32. Friction, knurl, or serrated push pins 105 extend through apertures 44 of boxes 28, 30, and 32 and into aperture 102 of box 34 for holding boxes 28, 30, 32, and 34 together with the front face of box 28 abutting with the back face of box 30, the front face of box 30 abutting with the back face of box 32, and the front face of box 32 abutting with the back face of box 34. Four adjustment screws 106 rotatably extend through boxes 28, 30, 32, and 34 at locations complementary to and for threadable receipt in adjustment holes 22 of base 12. Snap keeper rings 108 are received on screws 106 to abut with the back of box 28, with electrical connection block 26 being axially captured on screws 106 by the head of screw 106 abutting with box 34 and snap ring 108 abutting with box 28. Thus, by threading screws 106 into and out of holes 22 of webs 16, block 26 is independently and adjustably held from webs 16 at four locations allowing the front face of box 34 defined by the front edges of sides 94, top 96, and bottom 98 to be adjusted to be flush and planar with the exterior surface of the drywall, plaster board or other finish surface of the wall. It should then be noted that bus bars 50 are captured in cavities 36 and their particular depression 38–40 as they abut against the bottom surface of cavities 36 and their particular depression 38–40 and the back surface or face of the next box 30, 32, and 34. Further, box 34 can be color-coded as desired for example can be yellow when bus bars 50 are provided in each of boxes 28, 30, and 32 with head portions 54 electrically connected and could be of a different color when portion 86 has been removed from connecting portion 56 of bus bar 50 of box 32 to electrically isolate head portions 54 thereof.

Figures 4, 8, 9:
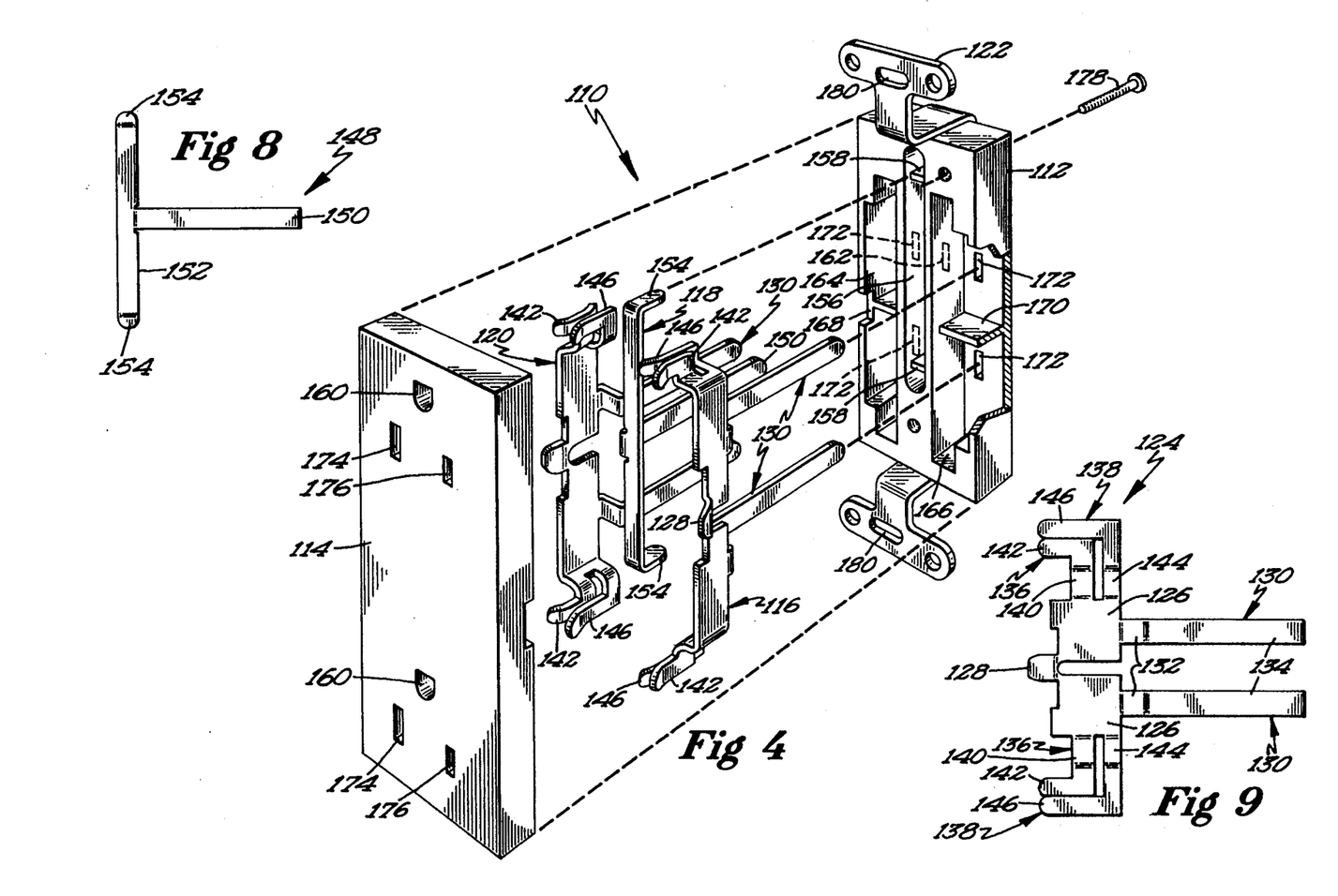
FIG. 4 shows an exploded perspective view of an outlet according to the preferred teachings of the present invention usable in the modular electrical wiring system of FIG. 1.
FIGS. 8 and 9 show flat layouts of bus bars of the outlet of FIG. 4.

System 10 according to the preferred teachings of the present invention further includes an outlet 110 including generally a lower casing 112, an upper casing 114, a neutral conductor or bus bar 116, a ground conductor or bus bar 118, a hot conductor or bus bar 120, and a connecting strap 122. Bus bars 116 and 120 are generally of the same construction and preferably are formed from a flat sheet 124 of electrically conductive material such as brass shown in FIG. 9. Specifically, sheet 124 includes first and second rectangular portions 126, with a tab 128 connected to the upper edges of portion 126 holding portions 126 in a spaced, parallel relation. A leg 130 extends from the lower edge of each portion 126 and includes a first portion 132 bent to extend generally perpendicular to portion 126 and a second portion 134 bent to extend generally perpendicular to portion 132 and parallel to portion 126. Portion 134 can be cut to extend through slot 40 and engage bus bar 50 of box 32 for bus bar 120 and can be cut to extend through slot 104 and depressions 40 and slots 90 of boxes 30 and 32 and engage bus bar 50 of box 28 for bus bar 116. First and second L-shaped lugs 136 and 138 extend in a generally parallel relation from the outer side edge of each portion 126. Specifically, lug 136 includes a first leg 140 extending outwardly from the side edge of portion 126 and which integrally intersects with a second leg 142 at a perpendicular angle. Similarly, lug 138 includes a leg 144 extending outwardly from the side edge of portion 126 and parallel to and spaced from leg 140 and which integrally intersects with a second leg 146 at a perpendicular angle. In the most preferred form, the bottom edge of leg 144 is contiguous and linear with the bottom edge of portion 126. Leg 144 has an outer extent which is generally equal to the outer extent of legs 140 and 142 of lug 136. Leg 146 has a forward extent which is generally equal to the forward extent of leg 142. Legs 140 and 144 are bent in the same direction along the outer edge of portion 126 generally perpendicular to portion 126. Legs 142 and 146 are bent in the same direction at their interconnections to legs 140 and 144, respectively, generally perpendicular to legs 140 and 144 and parallel to portion 126 and each other. Due to the increased length of legs 144 over legs 140, it can be appreciated that leg 146 will be held in a spaced parallel relation to leg 142 and forms the female receptacle for the male prong of a standard electrical plug-in, not shown. The free ends of legs 142 and 146 can be arcuately bent apart as shown to facilitate entry of the male prong in use. In the preferred form, tab 128 is bent at an obtuse angle outwardly from portions 132 and legs 140 and 144 and may include a break line at its interconnection to portions 126 to allow electric isolation of first and second portions 126 in bus bars 116 and 120.

Bus bar 118 is also preferably formed from a flat sheet 148 of electrically conductive material such as brass shown in FIG. 8. Generally, sheet 148 is T-shaped and includes a leg 150 integrally secured to a head 152. Leg 150 is bent generally perpendicularly to head 152 and has a length to extend through slot 104 of box 34 and depression 39 and slot 88 of box 32 and engage bus bar 50 of box 30. Head 152 is bent adjacent the free ends thereof to include portions 154 extending perpendicularly thereto and in a direction parallel to and spaced from leg 150.

Lower casing 112 generally includes a first cavity 156 having an elongated shape. First and second pedestals 158 upstand inside of cavity 156 spaced from and parallel to the ends thereof. The outer surfaces of pedestals 158 are spaced complementary to and for slideable receipt of the inner surfaces of end portions 154. Head 152 between end portions 154 is sandwiched and captured between the upper ends of pedestals 158 and casing 114. Casing 114 includes openings 160 for the receipt of the male ground prong of a standard electrical plug-in, not shown, for receipt in cavity 156 and in electrical contact with end portions 154, with the spacing between the outer surfaces of end portions 154 and the ends of cavity 156 being such to insure electrical contact. A slot 162 is formed in cavity 156 and connecting strap 122 for slideable receipt of leg 150, with leg 150 being in electrical contact with connecting strap 122.

Lower casing 112 further includes second and third cavities 164 and 166 of a size and shape for slideable receipt of bus bars 116 and 120, respectively. Particularly, the outer side walls of cavity 164 and 166 have a size and shape for slideably receiving and abutting with faces of portions 126 and includes a notch 168 for passage of tab 128 therethrough. The outer side walls of cavities 164 and 166 are also shaped for slideably receiving and generally abutting with legs 142. The inner side walls of cavities 164 and 166 are also shaped for slideably receiving and generally abutting with legs 146. The top and bottom walls of cavities 164 and 166 are also shaped for slideably receiving and generally abutting with the outer end edges of legs 142 and 146. Partition walls 170 upstand in cavities 164 and 166 for slideable receipt and abutting with the inner edges of portions 126. Each of cavities 164 and 166 include slots 172 for slideable receipt of portions 134. The bottom edges of portions 126 and legs 144 and portions 132 abut with the bottom surfaces of cavities 164 and 166 while the upper edges of portions 126 and legs 142 and 146 abut with casing 114. Casing 114 includes openings 174 for the receipt of the male hot prong of a standard electrical plug-in, not shown, for receipt between legs 42 and 146 of bus bar 120. Casing 114 further includes openings 176 for the receipt of the male neutral prong of a standard electrical plug-in, not shown, for receipt between legs 142 and 146 of bus bar 116. Casings 112 and 114 and connecting strap 122 can be connected together by any suitable means such as pins 178, thereby sandwiching bus bars 116, 118, and 120 therebetween. It should then be noted that tabs 128 can be broken through notches 168 in the field in a conventional manner if it is desired to electrically isolate the two halves of outlet 110. Connecting strap 122 is generally U-shaped and includes installation apertures 180 extending through the free ends thereof.

System 10 according to the preferred teachings of the present invention includes a cover plate 182 having a central aperture 184 of a size and shape complementary to casing 114 of outlet 110. Cover plate 182 further includes installation apertures 186 corresponding to installation apertures 180 of connecting strap 122 of outlet 110 and securement apertures 102 of box 34. Plate screws 188 can extend through apertures 180 and 186 and are threadably received in apertures 102 for holding cover plate 184, outlet 110, and connection block 26 in an installed condition relative to each other. It should then be noted that in the installed condition, portion 134 of bus bar 120 is in electrical contact with bus bar 50 of box 32, leg 150 of bus bar 118 is in electrical contact with bus bar 50 of box 30, and portion 134 of bus bar 116 is in electrical contact with bus bar 50 of box 28.

Figures 2, 5, 6:
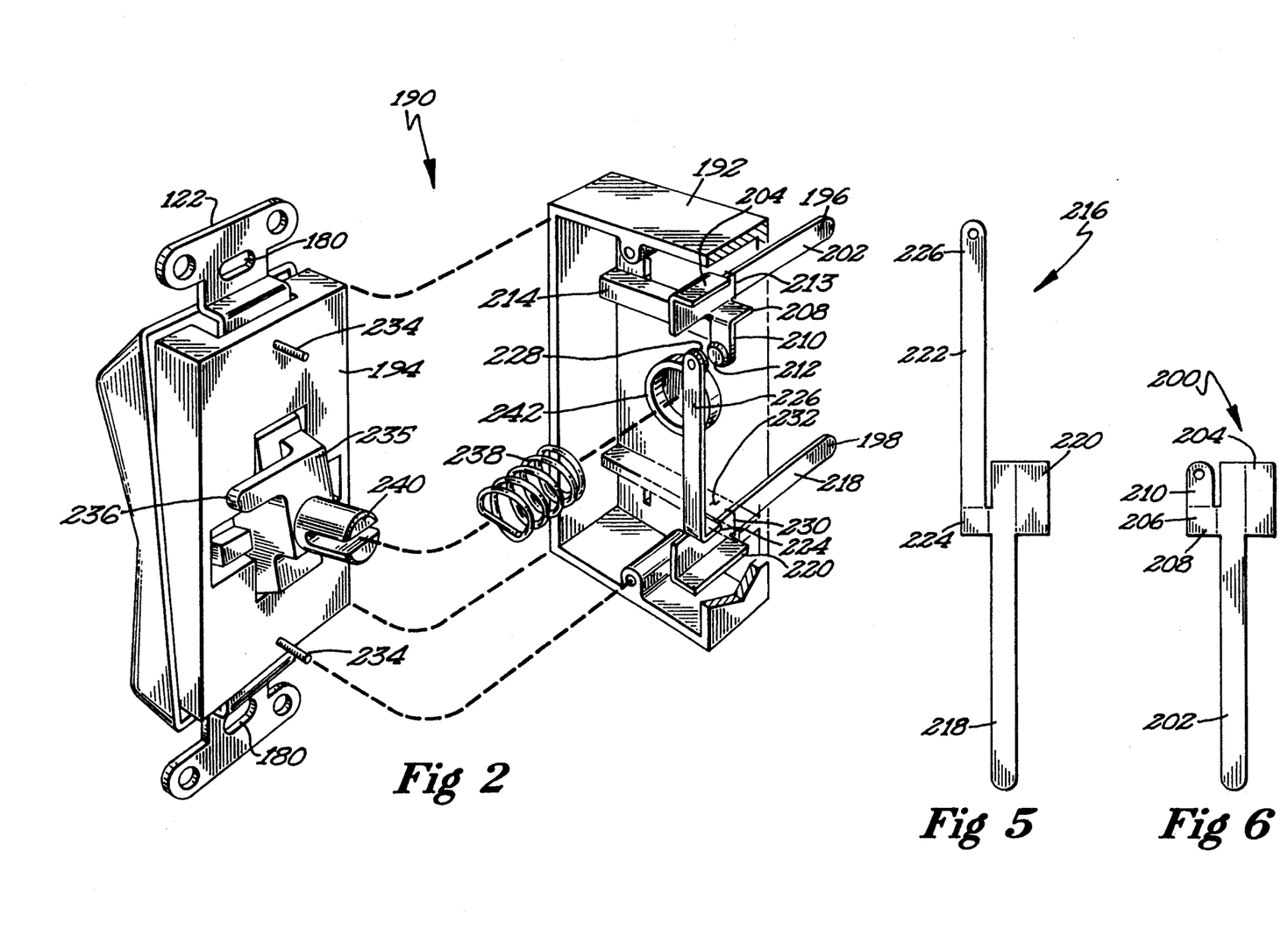
FIG. 2 shows an exploded perspective view of a switch according to the preferred teachings of the present invention usable in the modular electrical wiring system of FIG. 1.
FIGS. 5 and 6 show flat layouts of bus bars of the switch of FIG. 2.

System 10 according to the preferred teachings of the present invention further includes a switch 190 including generally a lower casing 192, an upper casing 194, a first conductor or bus bar 196, and a second conductor or bus bar 198. Bus bar 196 is preferably formed from a flat sheet 200 of electrically conductive material such as brass shown in FIG. 6. Specifically, sheet 200 includes an elongated leg 202. The side edge of a first ear 204 having a height generally equal to the height of casing 192 is integrally connected to the side edge of leg 202 adjacent to its upper end and is bent at a nonlinear angle and specifically generally perpendicularly thereto. The upper end of ear 204 is at the same extent as the upper end of leg 202 while the lower end of ear 204 is located intermediate the upper and lower ends of leg 202. A second ear 206 is further provided including a first portion 208 having a side edge integrally connected to the opposite side edge of leg 202 adjacent to but spaced from its upper end and bent at a nonlinear angle and specifically generally perpendicular thereto and generally parallel to ear 204. The lower extent of first portion 208 is at the same extent as the lower end of ear 204. Ear 206 further includes a second portion 210 integrally connected to portion 208 and bent generally perpendicular to portion 208, with portion 210 having the same upper extent as leg 202 and ear 204 in sheet 200. An electrical contact 212 is secured adjacent the free end of portion 210.

Leg 202 extends through a slot 213 formed in the bottom of casing 192. Casing 192 further includes a block 214 of a square cross section secured to the bottom thereof. The side edge of leg 202 and portion 208 abuts with the outer surface of block 214 and portion 210 abuts with the top surface of block 214. The lower end of ear 204 abuts with the bottom of casing 192 and the upper ends of leg 202 and ear 204 abut with casing 194. Thus, bus bar 196 is securely held in casings 192 and 194.

Bus bar 198 is preferably formed from a flat sheet 216 of electrically conductive material such as spring steel having a brass coating shown in FIG. 5. Specifically, sheet 216 includes an elongated leg 218. The side edge of a first ear 220 having a height generally equal to the height of casing 192 is integrally connected to the side edge of leg 218 adjacent to its upper end and is bent at a nonlinear angle and specifically generally perpendicularly thereto. The upper end of ear 220 is at the same extent as the upper end of leg 218 while the lower end of ear 220 is located intermediate the upper and lower ends of leg 218. A second, elongated ear 222 is further provided including a first portion 224 having a side edge integrally connected to the opposite side edge of leg 218 adjacent to but spaced from its upper end and bent at a nonlinear angle and specifically generally perpendicular thereto and generally parallel to ear 220. The lower end of portion 224 is at the same extent as the lower end of ear 220. Ear 222 further includes a second portion 226 integrally connected to portion 224 and bent generally perpendicular to portion 224 but in the preferred form at an obtuse angle thereto, with ear 222 having a length which is a multiple of the length of ear 220 such that portion 226 has an upper extent greatly exceeding that of leg 218 and ear 220 in sheet 216. An electrical contact 228 is secured adjacent the free end of portion 226.

Leg 218 extends through a slot 230 formed in the bottom of casing 192. Casing 192 further includes a block 232 of a square cross section secured to the bottom thereof. The side edge of leg 218 and portion 224 abuts with the outer surface of block 232 and portion 226 generally abuts with the top surface of block 232. The lower end of ear 220 and portion 224 abut with the bottom of casing 192 and the upper ends of leg 218 and ear 220 abut with casing 194. Thus, bus bar 198 is securely held in casings 192 and 194. Casings 192 and 194 can be held together by any suitable means such as pins 234 as shown.

It can then be appreciated that second portion 226 is held in a cantilever manner from first portion 224, leg 218, and ear 220, with contact 228 on the free end thereof being moveable between a first, electrically spaced condition from contact 212 as shown in FIG. 2 with portion 226 extending at an obtuse angle to portion 224 and a second, electrically engaged condition from contact 212 with portion 226 extending generally perpendicular to portion 224. In the preferred form, casing 194 includes suitable means for moving second portion 226 between its first and second conditions. Particularly, in the preferred form, casing 194 pivotally mounts a toggle 235 having a contact actuator arm 236 which engages second portion 226 adjacent to its free end and on the side opposite contact 228. An overcenter spring 238 is slideably received on a spring post 240 formed on toggle 235 and is slideably received in a retaining cup 242 formed in casing 192. Casing 194 further includes connecting strap 122 having installation apertures 180. Central aperture 184 of cover plate 182 has a size and shape complementary to casing 194 of switch 190. Thus, screws 188 can extend through apertures 180 and 186 and are threadably received in apertures 102 for holding cover plate 184, switch 190, and connection block 26 in an installed condition relative to each other. It should then be noted that in the installed condition, legs 202 and 218 are in electrical contact with bus bar 50 of box 32, with connecting portion 56 of bus bar 50 having removed portion 86 to electrically isolate the first and second head portions 54 from each other. Thus, with second portion 226 in its second condition, first and second head portions 54 are electrically connected to each other through bus bars 196 and 198 and with second portion 226 in its first condition, first and second head portions 54 of bus bar 50 remain electrically isolated.

Now that the basic construction of modular electrical wiring system 10 according to the preferred teachings of the present invention has been explained, the installation and subtle features of system 10 can be set forth and appreciated. Either before or after securement of base 12 by nails 24 to the stud or other framing member, the stripped wires of the power distribution cable are electrically connected to head portions 54 of bus bars 50 by pushing the wire (without the use of tools) into the appropriate opening 46 of boxes 28, 30, and 32 for capture between the free end of portion 78 and the side plates of head portions 54, with the angle of portion 78 preventing the wire from being pulled from bus bar 50 and back out opening 46. It should then be noted that boxes 28, 30, and 32 are colored to correspond to the color coding of the wires of the power distribution cable and of standard electrical color coding. It should then be noted that the likelihood of misconnection is substantially reduced and easily detected with system 10 according to the teachings of the present invention. It should further be noted that bus bars 50 are substantially enclosed within electrical connection block 26 and only limited accessibility is allowed through slots 88, 90 and 104 such that the possibility of shock or short circuiting is substantially prevented. If desired, the wires can be removed from between the side plates of head portions 54 and portion 78 by inserting a screw driver or other relatively sharp tool through slot 48 to engage arm 72. It can then be appreciated that the junction box of system 10 according to the teachings of the present invention including base 12 and electrical connection block 26 is prewired prior to the installation of the drywall or other wall covering the framing member.

After installation of the wall, adjustment of the front face of electrical connection block 26 defined by the front edges of sides 94, top 96, and bottom 98 of box 34 can be performed by independently threading screws 106 into and out of base 12 until the front face is planar with the outer surface of the wall. It can then be appreciated because of the independent adjustment in at least three spaced points (with four screws 106 being provided in the preferred form), the front face of block 26 can be adjusted to be flush and planar with the outer surface of the wall independent of the squareness of the stud or other forming member to the wall.

After adjustment of block 26 relative to the wall, the electrical device such as outlet 110 or switch 190 can be inserted into receptacle box 34 of block 26 without the use of tools. It should then be noted that legs 130 and 150, of bus bars 116, 118 and 120 which form the contact blades of outlet 110 or legs 202 and 218 of bus bars 196 and 198 which form the contact blades of switch 190 extend through the respective slots 88, 90, and 104 of block 26 and electrically contact bus bars 50 of the respective box 28, 30, and 32. It should be noted that the differing lengths of legs 130, 150, 202, and 218 forming the contact blades for electrical connection with bus bars 50 prevent electrical misconnection of outlet 110 and switch 190 to the power distribution cable. It should also be noted that the lengths of legs 130, 150, 202, and 218, the differing depths of bus bars 50 of boxes 28, 30, and 32 and the depth of box 34 prevent the possibility of shock in the installation or removal of outlet 110 or switch 190. In the preferred form, the free ends of legs 130, 150, 202, and 218 are frictionally gripped by the V-shaped cross section of connecting portion 56 of bus bars 50 to retain outlet 110 or switch 190 within box 34.

After installation of outlet 110 or switch 190, cover plate 182 can be installed by passing screws 188 through openings 186 of cover plate 182 and apertures 180 of connecting strap 122 to secure cover plate 182 and outlet 110 or switch 190 to box 34 of block 26. It can then be appreciated that this is one less installation step than conventional wiring systems which utilized separate screws for installing the outlet or switch to the junction box and for installing the cover plate to the outlet or switch.

It should then be appreciated that modular electrical wiring system 10 of the present invention is formed of a relatively few number of components, with boxes 28, 30 and 32, bus bars 50, and bus bars 116 and 120 being of substantially the same construction to minimize capital costs for tooling and/or inventory, and which components can be easily and rapidly assembled. Also, bus bars 50, 116,118, 120, 196, and 198 are stamped from sheet material 52, 124, 148, 200, and 216 to reduce tooling and assembly requirements. Likewise, base 12 can be formed by extruding to reduce tooling and assembly requirements.

It should be noted that boxes 28, 30, 32, and 34 and casings 112, 114, 192, and 194 can include removed portions and can be otherwise shaped to reduce the material necessary in formation, thus reducing the costs of manufacture thereof.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Modular electrical wiring system for installation in a wall having an outer surface and including at least one framing member comprising, in combination: a hanger including at least a first web and means for securing the hanger to the framing member with the first web being generally parallel to and spaced in a spacing direction from the outer surface of the wall; a housing for receipt of an electrical device, with the housing having a front face; and means for independently and simultaneously holding the housing at least at three locations at adjustable spacings in the spacing direction from the first web allowing the front face of the housing to be adjusted relative to the web to be planar with the outer surface of the wall.

2. The modular electrical wiring system of claim 1 wherein the wall has an inside surface; wherein the framing member includes an outer face which is directly abutted by the inside surface of the wall; and wherein the hanger further comprises, in combination: at least a first plate having a front edge, with the first web extending generally perpendicular to the plate, with the securing means extending through the plate, with the front edge of the plate being alignable with the outer face of the framing member which is abutted by the inside surface of the wall.

3. The modular electrical wiring system of claim 2 wherein the hanger further comprises, in combination: a second plate, with the first web extending generally perpendicularly between the first and second plates, with the securing means comprising at least a first nail, and nail holes formed in the first and second plates for slideably receiving the nails; and means located between the first and second plates and secured to the first web for holding the nail to prevent relative movement between the nail and the first and second plates and the web during storage and transportation and for allowing removal of the nail when the nail is desired to be slid in the nail holes during installation.

4. The modular electrical wiring system of claim 3 wherein the hanger further comprises, in combination: a second web extending generally perpendicularly between the first and second plates and spaced from the first web; wherein the slidably receiving means comprises a material located intermediate the first and second webs and the first and second plates, with the material including a nail hole for aligning the nail with the nail holes formed in the first and second plates.

5. The modular electrical wiring system of claim 1 wherein the three locations are nonlinear.

6. Modular electrical wiring system for installation in a wall including at least one framing member comprising, in combination: a hanger including at least a first web and means for securing the hanger to the framing member; a housing for receipt of an electrical device; and means for adjustably holding the housing from the first web; wherein the housing comprises, in combination: first, second and third electrical control boxes; a receptacle box for receipt of the electrical device; means for securing the boxes in a stacked condition with the second box abutting with the first box, the third box abutting with the second box and the receptacle box abutting with the third box; a first bus bar in the first electrical control box; a second bus bar in the second electrical control box; a third bus bar in the third electrical control box; a first slot through the receptacle, second and third boxes for electrical access to the first bus bar and electrically spaced from the second and third bus bars; a second slot through the receptacle and third boxes for electrical access to the second bus bar and electrically spaced from the third bus bar; and a third slot through the receptacle box for electrical access to the third bus bar.

7. The modular electrical wiring system of claim 6 wherein the first, second, and third electrical control boxes are generally of the same construction and generally comprise, in combination: a plate having front and back faces and top, bottom, and side edges, with the front faces of the plates abutting with the back face of the next plate when the boxes are in a stacked condition; first, second, and third depressions extending from the front face towards but spaced from the back face and the edges, with the depressions being spaced and parallel to each other; at least a first cavity extending from the front face towards but spaced from the back face and the edges, with the first cavity intersecting with the first, second, and third depressions; and wherein the bus bars each include a head portion of a size complementary to and for slideable receipt in the first cavity and a connecting portion of a size complementary to and for slideable receipt in one of the first, second, and third depressions, with the connecting portion of the first bus bar located in the first depression of the first box, the connecting portion of the second bus bar located in the second depression of the second box, and the connecting portion of the third bus bar located in the third depression of the third box, with the head portion being electrically connectable to a power distribution cable.

8. The modular electrical wiring system of claim 6 wherein the first, second, and third electrical control boxes are generally of the same construction and each include first, second, and third depressions spaced and parallel to each other, with the first bus bar located in the first depression of the first box, with the second bus bar located in the second depression of the second box, and with the third bus bar located in the third depression of the third box.

9. The modular electrical wiring system of claim 8 wherein the portions of the bus bars inside of the depressions have a V-shaped cross section; and wherein the electrical device includes a plurality of contact blades of a single layer for slideable receipt in the V-shaped cross section portions, with the contact blades of the electrical device having a length for passage through the respective first, second, or third slot.

10. The modular electrical wiring system of claim 9 further including a switch comprising, in combination: a lower casing, an upper casing, a first conductor, and a second conductor, wherein the first conductor is formed from a flat sheet and comprises, in combination: a contact blade having an upper end, a lower end, and first and second sides, a first ear having an upper end, a lower end, and a side, with the side of the first ear integrally connected to the first side of the contact blade and bent at a nonlinear angle thereto, with the upper end of the first ear being at the same extent as the upper end of the contact blade and the lower end of the first ear located intermediate the upper and lower ends of the contact blade, a second ear having a first portion and a second portion integrally connected to and extending generally perpendicular to the first portion, with the first portion having a side integrally connected to the second side of the contact blade and bent at a nonlinear angle thereto and having a lower end at the same extent as the lower end of the first ear; wherein the second conductor is formed from a flat sheet and comprises, in combination: a contact blade having an upper end, a lower end, and first and second sides, a first ear having an upper end, a lower end, and a side, with the side of the first ear integrally connected to the first side of the contact blade and bent at a nonlinear angle thereto, with the upper end of the first ear being at the same extent as the upper end of the contact blade and the lower end of the first ear located intermediate the upper and lower ends of the contact blade, a second ear having a first portion and a second portion integrally connected to and extending generally perpendicular to the first portion, with the first portion having a side integrally connected to the second side of the contact blade and bent at a nonlinear angle thereto and having a lower end at the same extent as the lower end of the first ear, with the second portion having an upper end, with the length between the lower end of the first portion and the upper end of the second portion being a multiple of the length between the lower end of the first portion and the upper end of the contact blade; with the lower casing including first and second slots for slideable receipt of the contact blades of the first and second conductors, with the lower ends of the first and second ears abutting with the lower casing and the upper ends of the first ear and of the contact blades abutting with the upper casing, with the free end of the second portion of the second conductor being movable between a first, electrically spaced condition from the second portion of the first conductor and a second, electrically engaged condition with the second portion of the first conductor; and wherein the upper casing includes means for moving the second portion of the second conductor between the first and second conditions, with the lower ends of the contact blades of the first and second conductors passing through the slots of the boxes and electrically engaging the bus bar.

11. The modular electrical wiring system of claim 10 wherein the lower casing includes first and second blocks, with the second portion of the first conductor resting on the first block and the second portion of the second conductor resting on the second block in the second condition.

12. The modular electrical wiring system of claim 9 further including an outlet comprising, in combination: a lower casing, an upper casing, a neutral conductor, a ground conductor, and a hot conductor; wherein the ground conductor is formed from a flat sheet and is generally T-shaped and comprises, in combination: a head having opposite ends, and a leg integrally secured to the head intermediate its ends and bent generally perpendicular to the head, with the head being bent perpendicularly adjacent the opposite ends thereof and spaced from the leg to include end portions extending in a direction parallel to and spaced from the leg; and wherein the lower casing comprises, in combination: a cavity having an elongated shape and first and second ends; first and second pedestals upstanding inside of the cavity and spaced from and parallel to the ends of the cavity, with the pedestals each having an outer face and an upper end, a slot in the cavity for the slideable receipt of the leg, with the end portions of the head abutting with the outer faces of the first and second pedestals, with the head being sandwiched between the upper ends of the pedestals and the upper casing.

13. The modular electrical wiring system of claim 12 wherein the neutral and hot conductors are each formed from a flat sheet and each comprise, in combination: a rectangular portion having an upper edge, a lower edge, and a side edge; a leg integrally extending from the lower edge and including a first portion bent to extend generally perpendicularly to the rectangular portion and a second portion bent to extend generally perpendicularly to the first portion and parallel to the rectangular portion; and means secured to the side edge for the receipt of a prong of an electrical plug in, with the lower casing including a slot for the slideable receipt of the second portion, with the upper end of the rectangular portion abutting with the upper casing and the lower end of the rectangular portion and the first portion abutting with the lower casing.

14. The modular electrical wiring system of claim 13 wherein the prong receipt means comprises, in combination: first and second lugs extending in a generally parallel relation from the side edge, with each of the lugs including first and second legs intersecting at a perpendicular angle, with the length of the first leg of the second lug being generally equal to the length of the first and second legs of the first lug, with the second legs of the first and second lugs being parallel and spaced from each other and from the rectangular portion.

15. The modular electrical wiring system of claim 6 wherein the adjustably holding means independently and adjustably holds the housing from the web at least at three locations allowing the housing to be adjusted relative to the web.

16. The modular electrical wiring system of claim 15 wherein the three locations are nonlinear.

17. The modular electrical wiring system of claim 15 wherein the adjustably holding means comprises, in combination: at least first, second, and third adjustment screws rotatably mounted in the housing and threadably received in the web; and means for axially capturing the housing on the adjustment screws for movement relative to the web with the threading of the adjustment screws into and out of the web.

18. Modular electrical wiring system including a housing for an electrical device comprising, in combination: first, second and third electrical control boxes; a receptacle box for receipt of the electrical device; means for securing the boxes in a stacked condition with the second box abutting with the first box, the third box abutting with the second box and the receptacle box abutting with the third box; a first bus bar in the first electrical control box; a second bus bar in the second electrical control box; a third bus bar in the third electrical control box; a first slot through the receptacle, second and third boxes for electrical access to the first bus bar and electrically spaced from the second and third bus bars; a second slot through the receptacle and third boxes for electrical access to the second bus bar and electrically spaced from the third bus bar; and a third slot through the receptacle box for electrical access to the third bus bar.

19. The modular electrical wiring system of claim 18 wherein the first, second, and third electrical control boxes are generally of the same construction and each include first, second, and third depressions spaced and parallel to each other, with the first bus bar located in the first depression of the first box, with the second bus bar located in the second depression of the second box, and with the third bus bar located in the third depression of the third box.

20. The modular electrical wiring system of claim 19 wherein the first, second, and third electrical control boxes each generally comprise, in combination: a plate having front and back faces and top, bottom, and side edges, with the front faces of the plates abutting with the back face of the next plate when the boxes are in a stacked condition, with the first, second, and third depressions extending from the front face towards but spaced from the back face and the edges, with the depressions being spaced and parallel to each other; at least a first cavity extending from the front face towards but spaced from the back face and the edges, with the first cavity intersecting with the first, second, and third depressions; and wherein the bus bars each include a head portion of a size complementary to and for slideable receipt in the first cavity and a connecting portion of a size complementary to and for slideable receipt in one of the first, second, and third depressions, with the connecting portion of the first bus bar located in the first depression of the first box, the connecting portion of the second bus bar located in the second depression of the second box, and the connecting portion of the third bus bar located in the third depression of the third box, with the head portion being electrically connectable to a power distribution cable.

21. The modular electrical wiring system of claim 20 wherein the electrical device comprises an outlet comprising, in combination: a lower casing, an upper casing, a neutral conductor, a ground conductor, and a hot conductor; wherein the ground conductor is formed from a flat sheet and is generally T-shaped and comprises, in combination: a head having opposite ends, and a leg integrally secured to the head intermediate its ends and bent generally perpendicular to the head, with the head being bent perpendicularly adjacent the opposite ends thereof and spaced from the leg to include end portions extending in a direction parallel to and spaced from the leg; and wherein the lower casing comprises, in combination: a cavity having an elongated shape and first and second ends; first and second pedestals upstanding inside of the cavity and spaced from and parallel to the ends of the cavity, with the pedestals each having an outer face and an upper end, a slot in the cavity for the slideable receipt of the leg, with the end portions of the head abutting with the outer faces of the first and second pedestals, with the head being sandwiched between the upper ends of the pedestals and the upper casing.

22. Modular electrical wiring system including a switch comprising, in combination: a lower casing, an upper casing, a first conductor, and a second conductor, wherein the first conductor is formed from a flat sheet and comprises, in combination: a contact blade having an upper end, a lower end, and first and second sides, a first ear having an upper end, a lower end, and a side, with the side of the first ear integrally connected to the first side of the contact blade and bent at a nonlinear angle thereto, with the upper end of the first ear being at a longitudinal position the same as the upper end of the contact blade and the lower end of the first ear located at an intermediate longitudinal position located between the upper and lower ends of the contact blade, a second ear having a first portion and a second portion integrally connected to and extending generally perpendicular to the first portion, with the first portion having a side integrally connected to the second side of the contact blade and bent at a nonlinear angle thereto and having a lower end at the intermediate longitudinal position; wherein the second conductor is formed from a flat sheet and comprises, in combination: a contact blade having an upper end, a lower end, and first and second sides, a first ear having an upper end, a lower end, and a side, with the side of the first ear integrally connected to the first side of the contact blade and bent at a nonlinear angle thereto, with the upper end of the first ear being at a longitudinal position the same as the upper end of the contact blade and the lower end of the first ear located intermediate the upper and lower ends of the contact blade, a second ear having a first portion and a second portion integrally connected to and extending generally perpendicular to the first portion, with the first portion having a side integrally connected to the second side of the contact blade and bent at a nonlinear angle thereto and having a lower end at a longitudinal position the same as the lower end of the first ear, with the second portion having an upper end, with the length between the lower end of the first portion and the upper end of the second portion being a multiple of the length between the lower end of the first portion and the upper end of the contact blade; with the lower casing including first and second slots for slideable receipt of the contact blades of the first and second conductors, with the lower ends of the first and second ears abutting with the lower casing and the upper ends of the first ear and of the contact blades abutting with the upper casing, with the free end of the second portion of the second conductor being movable between a first, electrically spaced condition from the second portion of the first conductor and a second, electrically engaged condition with the second portion of the first conductor; and wherein the upper casing includes means for moving the second portion of the second conductor between the first and second conditions, with the lower ends of the contact blades of the first and second conductors passing through the slots of the boxes and electrically engaging the bus bar.

23. The modular electrical wiring system of claim 22 wherein the lower casing includes first and second blocks, with the second portion of the first conductor resting on the first block and the second portion of the second conductor resting on the second block in the second condition.

24. Modular electrical wiring system for installation in a wall including at least one framing member comprising, in combination: a hanger including at least a first web and means for securing the hanger to the framing member; a housing for receipt of an electrical device; at least a first adjustment screw rotatably mounted in the housing, with the web including an adjustment hole, with the adjustment screw being threaded into the adjustment hole of the web; and means for axially capturing the housing on the adjustment screw for movement relative to the web with the threading of the adjustment screw into and out of the adjustment hole of the web.

25. The modular electrical wiring system of claim 24 wherein the wall has an outer surface and the housing has a front face; and wherein the modular electrical wiring system further comprises, in combination: a second adjustment screw rotatably mounted in the housing and threadably received in the web, with the first and second adjustment screws independently and adjustably holding the housing from the first web simultaneously at spaced locations allowing the front face of the housing to be adjusted relative to the web to be planar with the outer surface of the wall.

26. The modular electrical wiring system of claim 25 further comprising, in combination: a third adjustment screw rotatably mounted in the housing and threadably received in the web, with the first, second and third adjustment screws independently and adjustably holding the housing from the first web simultaneously at least at three locations; wherein the three locations are nonlinear.

27. Modular electrical wiring system including an electrical device for installation in a wall including at least one framing member, comprising, in combination: a hanger including a first web and a second web, with the first web being spaced from the second web; a nail for securing the hanger to the framing member; and means located intermediate the first and second webs for removably holding the nail during storage and transportation of the hanger, with the removably holding means including a nail hole spaced from the first and second webs for receipt of the nail when securing the hanger to the framing member.

28. The modular electrical wiring system of claim 27 wherein the hanger further includes at least a first plate, with the webs extending generally perpendicular to the plate, with the first plate including a nail hole for slideably receiving the nail, with the nail hole in the removably holding means aligning the nail with the nail hole formed in the first plate.

29. The modular electrical wiring system of claim 28 wherein the hanger further includes a second plate, with the webs extending generally perpendicularly between the first and second plates, with the second plate including a nail hole for slideably receiving the nail, with the nail hole in the removably holding means also aligning the nail with the nail hole formed in the second plate.

* * * * *